3,110,550
PROCESS FOR ISOLATING CHLOROSULFONATED OR CHLORINATED POLYOLEFIN ELASTOMERS FROM SOLUTIONS IN CARBON TETRACHLORIDE
Paul R. Johnson, Wilmington, Del., assignor to E. I. du Pont de Nemours and Company, Wilmington, Del., a corporation of Delaware
No Drawing. Filed Aug. 7, 1961, Ser. No. 129,548
8 Claims. (Cl. 18—57)

This invention relates to an improved method for isolating elastomeric products derived from polyolefins and is more particularly concerned with an improved method for isolating chlorinated and chlorosulfonated polyethylene polymers from fluid solutions thereof in carbon tetrachloride.

A very convenient method for isolating chlorinated and chlorosulfonated ethylene polymers in solid form substantially free from volatile components is to apply the carbon tetrachloride solution of these polymers to a moving, heated metallic surface, maintaining a film of the solution in contact with it until substantially all of the solvent has been removed, and then removing the resulting dried, self-supporting film. This process is described in U.S. Patent 2,923,979 wherein, in the preferred embodiment, chlorosulfonated polyethylene in the carbon tetrachloride solution is fed between two rotating drums heated to 100° C. to 200° C. As the solution is carried on the surface of the drum, the carbon tetrachloride is driven off by evaporation and recovered in another part of the apparatus. After the elastomeric product on the drum has completed approximately three-fourths of a revolution, it is stripped off in the form of a self-supporting film.

Although this process is entirely practical and satisfactory, a substantial increase in the rate of drying, if not accompanied by any impairment in the properties of the dried product, would be very desirable.

It is an object of this invention to provide an improved process for isolating elastomeric materials derived from polyolefins from fluid solutions thereof in carbon tetrachloride. It is a further object of this invention to provide an improved process which will greatly increase the rate of drying said elastomeric products. A still further object of this invention is to provide a process for increasing the rate of drying elastomeric materials without impairing the properties of the dried product. Other objects of this invention will appear hereinafter.

These and other objects of this invention are accomplished by providing in a process for isolating chlorosulfonated or chlorinated polyolefin elastomers from fluid solutions in carbon tetrachloride which comprises applying a film of said solution to a moving smooth inert metal surface maintained at 100° C. to 200° C., maintaining the film on the surface until the carbon tetrachloride content of the film has been reduced to not more than about 3% by weight, and then separating the film from the surface in the form of a self-supporting reticulate sheet, the improvement of dispersing from 4 to 15% by weight of water in the carbon tetrachloride solution of the polymer prior to applying to the metal surface.

In a preferred embodiment of this invention the chlorosulfonated or chlorinated polyolefin elastomers are derived from a polyethylene, i.e. homopolymers of ethylene, or copolymers of ethylene with one or more terminally unsaturated olefins containing about 3 to 6 carbon atoms such as propene (propylene), 1-butene, 1-pentene and 1-hexene. The polymer preferably has a number-average molecular weight of at least 8000. The elastomeric product to be dried contains about 20 to 50% chlorine by weight. It preferably contains 25 to 37% by weight chlorine and about 0 to 4% by weight sulfur. In the case of polyethylene, it may be either branched (low density) or linear (high density) or of intermediate character.

The essence of the present invention resides in the use of water in the carbon tetrachloride solution. In general the improvement in production rate increases as the proportion of water dispersed in the solution increases, but with high concentration the advantage of increased production rate tends to be counterbalanced by the increased heat required to evaporate the large amount of water. That is, little or no improvement in production rate occurs with amounts of water below 4% by weight, but the upper limit is determined by economics. The cost of removing more than 15% by weight will tend to outweigh the advantages obtained thereby.

The water may be dispersed in the carbon tetrachloride solution by the methods commonly used for emulsification without the use of an added dispersing agent. However, agents such as the sodium salt of long-chain alkanol sulfates, for example 7-ethyl-2-methyl-undecanol sulfate, may be used if desired.

The solution to be dried must be fluid and accordingly will not ordinarily be more concentrated than about 25% by weight of elastomeric polymer. Solutions as dilute as 1% are operable but the preferred concentrations are between 5 and 20%. Although the improvement resulting from the addition of water is relatively greater for the dilute solutions, the rate of production of solid polymer is still low for these solutions, because of the large proportion of solvent to be evaporated. When operating the process with rotating drums serving as the moving metal surface, the rate of rotation of the drums should be slow enough to provide for the film to be in contact with it long enough to be sufficiently dried. The operating temperature of the drums is preferably between 150 and 185° C. and may be obtained by internal heating. It is desirable but not essential to preheat the solution to be evaporated to 40–70° C. The above considerations also apply when the moving smooth inert metal surface is in other forms, such as a heated endless flexible strip of metal.

An apparatus which may be used for carrying out the present invention is fully described in U.S. Patent 2,923,979. Furthermore, the various forms of apparatus which may be used, the operation of the apparatus, and the interrelation of variables such as temperature, concentration, and rate of movement of the heated surfaces in the present invention are the same as described in this patent but will be specifically discussed hereinafter when necessary. The preferred form of the apparatus is shown in FIGURE 1 of the patent and uses two parallel, horizontal heated rolls, revolving in opposite directions and downward from the position at which they approach each other, thus forming a trough containing the solution to be evaporated. The separation between the rolls or "bite" is usually between 0.003 and 0.012 inch. The partly concentrated solution moves downward from the trough between the rolls and is carried thereafter as an evaporated film on the heated surfaces of the rolls to positions near the top of the revolution of the rolls. At this point the dried, self-supporting films are removed by means of knives. The heated metal surface is moved at such a rate that most of the solvent is evaporated from the film before it reaches the point at which it is separated from the metal surface.

The following examples illustrate specific embodiments of the operation of this invention.

EXAMPLE 1

The drier used consists of two horizontal chrome-plated rolls, 6 inches in diameter and 7.5 inches long. They are hollow so as to be heated internally with steam. They rotate in opposite directions at the same selected speed, with their surfaces almost in contact tangentially with each other to form a passage or "bite" 0.010 inch wide. The elastomer solution to be dried is contained in the trough thus formed between the two rolls and closed at the ends by well-fitting plates or dams. Part of the solvent boils out due to the heat supplied by the steam-heated rolls. The concentrated solution passes downward through the "bite" and becomes evenly distributed over the lower parts of the two rolls. Evaporation of the solvent continues as the films are carried around on the surface of the rolls. When the elastomer films have reached points near the highest points of the rolls, they are removed by knives, held at an angle firmly against the rolls by spring or weight loading. A self-supporting sheet of the elastomer results. The solution to be dried is fed continuously so as to maintain a constant level in the trough between the rolls.

The chlorosulfonated polyethylene used contains 34% by weight chlorine and 0.9% by weight sulfur and is made in carbon tetrachloride solution from linear polyethylene with a density of 0.955 and a melt index of 4, corresponding to a weight average molecular weight of about 70,000. After removal of substantially all of the residual chlorine and sulfur dioxide and by-product hydrogen chloride from the solution by boiling, the solution contains 9% by weight of the chlorosulfonated polyethylene. Water, in the proportion based on the weight of the solution given in the following table, is incorporated in this solution by stirring at 1100 r.p.m. with a six blade turbine stirrer. A stable dispersion results with the water as the dispersed or internal phase. This dispersion is warmed to 60° C. and fed to the trough between the rolls at such a rate as to keep it almost full. The production rate is determined by weighing the amount of dried material formed in a fixed time after steady operation is established and expressing the result in pounds per hour per square foot of drum surface. The following Table I gives production rates of two different drum speeds for solutions containing 0 to 8% by weight of water.

The rolls are heated with steam at 100 lbs. per square inch gauge, giving a theoretical temperature of 170° C.

Table I

| Run No. | $H_2O$, Percent by Wt. | Drum Speed, r.p.m. | Production Rate, lbs./hr./sq. ft. | Improvement, Percent | $CCl_4$ in Product, Percent by Wt. |
|---|---|---|---|---|---|
| 1 | 0 | 4.5 | 1.12 | -------- | 0.45 |
| 2 | 4 | 4.5 | 1.23 | 10 | 0.40 |
| 3 | 6 | 4.5 | 1.30 | 16 | 0.38 |
| 4 | 8 | 4.5 | 1.62 | 45 | 0.45 |
| 5 | 0 | 6.0 | 1.24 | -------- | 0.35 |
| 6 | 4 | 6.0 | 1.36 | 10 | 0.45 |
| 7 | 6 | 6.0 | 1.72 | 39 | 0.35 |
| 8 | 8 | 6.0 | 1.80 | 45 | 0.50 |

The water content of the elastomeric polymer when removed from the drum surface is less than 0.5% by weight. No significant difference, from the elastomer isolated without the addition of water, is observed in color, plasticity, or stability, or in the properties after curing.

EXAMPLE 2

The chlorosulfonated polyethylene used here is made from a polyethylene of density 0.926 and melt index 10. It contains 29% by weight chlorine and 1.4% by weight sulfur. The equipment and procedure are the same as in Example 1 except that the water is continuously emulsified in the carbon tetrachloride solution. The concentration of chlorosulfonated polyethylene (9% by weight), the temperature of the solution as fed (60° C.), the steam pressure (100 lbs.) and the separation ("bite") between the rolls (0.010 inch) are the same as in Example 1.

Table II

| Run No. | $H_2O$, Percent by Wt. | Drum Speed, r.p.m. | Production Rate, lbs./hr./sq. ft. | Improvement, Percent | $CCl_4$ in Product, Percent by Wt. |
|---|---|---|---|---|---|
| 1 | 0 | 4.5 | 2.67 | -------- | 0.92 |
| 2 | 5.3 | 4.5 | 3.22 | 20 | 0.77 |
| 3 | 0 | 8.0 | 3.53 | -------- | 1.57 |
| 4 | 4.9 | 8.0 | 4.47 | 27 | 1.82 |

EXAMPLE 3

This example uses a chlorinated polyethylene, made from the same type of polyethylene as used in Example 2 and containing 31% by weight chlorine. An 18% by weight solution of this in carbon tetrachloride containing 8% by weight dispersed water is fed at 60° C. to the drier used in Example 1, operated at 100 lbs. pressure, a bite of 0.010 inch, and a drum speed of 4.72 r.p.m. The production rate of dried material, which contains 0.59% by weight carbon tetrachloride and no water, is 3.80 lbs. per hr. per sq. ft., as compared with 2.92 lbs. for the same solution without water under the same conditions.

EXAMPLE 4

This example uses the equipment described in Example 1 for isolating the elastomer of Example 1 at other temperatures. The solution is an 8.7% solution in carbon tetrachloride, containing 7.5% of water, based on the weight of water-free solution. The drums, rotating at 8 r.p.m., are heated with steam at 50, 100, and 150 lbs. gauge pressure, giving temperatures of approximately 147, 170, and 185° C. respectively. The solution is fed at about 50° C. The results are shown in Table III. The residual carbon tetrachloride is less than 0.1% by weight in each case.

Table III

| Run No. | Temperature, °C. | Production Rate, grams/min./roll | Control (no water) | Improvement, Percent |
|---|---|---|---|---|
| 1 | 147 | 13.5 | 9.3 | 45 |
| 2 | 170 | 14.2 | 9.4 | 51 |
| 3 | 185 | 13.7 | 10.4 | 32 |

EXAMPLE 5

This illustrates the use of a more dilute solution of chlorosulfonated polyethylene, the other conditions being as in Example 4 except that the steam pressure is only 30 lbs. (134° C.), the solution to be dried is fed at 25° C., and the drum speed is 6 r.p.m. The solution contains 4% by weight chlorosulfonated polyethylene and 10% by weight of water based on the carbon tetrachloride. Dried elastomer containing less than 0.1% by weight carbon tetrachloride is formed at a rate of 6.69 grams per minute per roll. In the control without water the rate is 1.67. The improvement is therefore 300%.

It will be understood that the examples heretofore presented are given for illustrative purposes solely, and that this invention is not limited to the specific embodiments described therein. On the other hand, it will be obvious to those skilled in the art that many variations and modifications can be made therein, such as in the equipment, conditions, elastomers, and proportions employed, within the limits set forth in the general description, without departing from the spirit and scope of this invention.

It will be apparent that this invention provides an improved process for the direct isolation of chlorosulfonated and chlorinated polymers of olefins from their solutions in carbon tetrachloride which is continuous, rapid, simple and easy to operate, practical and economical. Therefore, this invention constitutes a valuable advance in and contribution to the art.

The embodiments of the invention in which an exclusive property or privilege is claimed are defined as follows:

1. In the process for isolating a polymer selected from the group consisting of chlorosulfonated polyolefins and chlorinated polyolefins from a fluid solution of said polymer in carbon tetrachloride which comprises applying a film of said solution to a moving smooth inert metal surface maintained at about 100° C. to 200° C., maintaining the film on said surface until the carbon tetrachloride content of the film has been reduced to not more than about 3% by weight, and then separating the dried film from the heated metal surface in the form of a self-supporting reticulate sheet, the improvement which comprises dispersing from 4 to 15% by weight of water in the carbon tetrachloride solution of the polymer prior to applying said film to the metal surface.

2. In the process for isolating a chlorosulfonated ethylene polymer from a fluid solution of said polymer in carbon tetrachloride which comprises applying a film of said solution to a moving smooth inert metal surface maintained at about 100° C. to 200° C., maintaining the film on said surface until the carbon tetrachloride content of the film has been reduced to not more than about 3% by weight, and then separating the dried film from the heated metal surface in the form of a self-supporting reticulate sheet, the improvement which comprises dispersing from 4 to 15% by weight of water in the carbon tetrachloride solution of the polymer prior to applying said film to the metal surface.

3. In the process for isolating a chlorosulfonated ethylene polymer from a fluid solution of said polymer in carbon tetrachloride, said polymer containing from 25% to 37% chlorine, by weight, and being derived from polyethylene having a number average molecular weight of at least 8000, which process comprises applying a film of said solution to a moving smooth inert metal surface maintained at about 100° C. to 200° C., maintaining the film on said surface until the carbon tetrachloride content of the film has been reduced to not more than about 3% by weight, and then separating the dried film from the heated metal surface in the form of a self-supporting reticulate sheet, the improvement which comprises dispersing from 4 to 15% by weight of water in the carbon tetrachloride solution of the polymer prior to applying said film to the metal surface.

4. In the process for isolating a chlorosulfonated ethylene polymer from a fluid solution, containing 5% to 20% by weight of said polymer in carbon tetrachloride, which comprises applying a film of said solution to a moving smooth inert metal surface maintained at about 100° C. to 200° C., maintaining the film on said surface until the carbon tetrachloride content of the film has been reduced to not more than about 3% by weight, and then separating the dried film from the heated metal surface in the form of a self-supporting reticulate sheet, the improvement which comprises dispersing from 4 to 15% by weight of water in the carbon tetrachloride solution of the polymer prior to applying said film to the metal surface.

5. In the process for isolating a chlorosulfonated ethylene polymer from a fluid solution of said polymer in carbon tetrachloride which comprises applying a film of said solution to a moving smooth inert metal surface formed by two parallel, horizontal rolls rotating in opposite directions and heated internally to a temperature within the range of 150° to 185° C., maintaining the film on said surface until the carbon tetrachloride content of the film has been reduced to not more than about 3% by weight, and then separating the dried film from the heated metal surface in the form of a self-supporting reticulate sheet, the improvement which comprises dispersing from 4 to 15% by weight of water in the carbon tetrachloride solution of the polymer prior to applying said film to the metal surface.

6. In the process for isolating a chlorinated ethylene polymer from a fluid solution of said polymer in carbon tetrachloride which comprises applying a film of said solution to a moving smooth inert metal surface maintained at about 100° C. to 200° C., maintaining the film on said surface until the carbon tetrachloride content of the film has been reduced to not more than about 3% by weight, and then separating the dried film from the heated metal surface in the form of a self-supporting reticulate sheet, the improvement which comprises dispersing from 4 to 15% by weight of water in the carbon tetrachloride solution of the polymer prior to applying said film to the metal surface.

7. In the process for isolating a chlorosulfonated copolymer from a fluid solution of said copolymer in carbon tetrachloride, said chlorosulfonated copolymer containing from 20 to 50% by weight chlorine and not more than 4% by weight sulfur and being derived from a copolymer of ethylene and a terminally unsaturated olefin containing about 3 to 6 carbon atoms, which comprises applying a film of said solution to a moving smooth inert metal surface maintained at about 100° C. to 200° C., maintaining the film on said surface until the carbon tetrachloride content of the film has been reduced to not more than about 3% by weight, and then separating the dried film from the heated metal surface in the form of a self-supporting reticulate sheet, the improvement which comprises dispersing from 4 to 15% by weight of water in the carbon tetrachloride solution of the copolymer prior to applying said film to the metal surface.

8. In the process for isolating a chlorinated copolymer from a fluid solution of said copolymer in carbon tetrachloride, said chlorinated copolymer containing from 20 to 50% by weight chlorine and being derived from a copolymer of ethylene and a terminally unsaturated olefin containing about 3 to 6 carbon atoms, which comprises applying a film of said solution to a moving smooth inert metal surface maintained at about 100° C. to 200° C., maintaining the film on said surface until the carbon tetrachloride content of the film has been reduced to not more than about 3% by weight, and then separating the dried film from the heated metal surface in the form of a self-supporting reticulate sheet, the improvement which comprises dispersing from 4 to 15% by weight of water in the carbon tetrachloride solution of the copolymer prior to applying said film to the metal surface.

References Cited in the file of this patent

UNITED STATES PATENTS

| | | |
|---|---|---|
| 2,923,979 | Kalil | Feb. 9, 1960 |
| 2,968,637 | Bowers | Jan. 17, 1961 |

FOREIGN PATENTS

| | | |
|---|---|---|
| 488,880 | Canada | Dec. 16, 1952 |
| 789,055 | Great Britain | Jan. 15, 1958 |